United States Patent [19]

Barker et al.

[11] Patent Number: 5,214,779
[45] Date of Patent: May 25, 1993

[54] VARIABLE CONSTRUCT REPRESENTATION EMBEDDED IN DATA STREAM WHICH REFERENCES DEFINITION FOR DYNAMICALLY GENERATING DATA USED IN PROCESSING THE DATA STREAM

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 213,425

[22] Filed: Jun. 30, 1988

[51] Int. Cl.5 ............................................. G06F 3/00
[52] U.S. Cl. ................... 395/600; 364/260; 364/260.1; 364/261; 364/260.4; 364/DIG. 1; 395/700
[58] Field of Search ... 364/200 MS File, 900 MS File, 364/401, 408; 395/600, 275, 114, 700

[56] References Cited

U.S. PATENT DOCUMENTS

| | | | |
|---|---|---|---|
| 3,930,237 | 12/1975 | Villers | 364/900 |
| 4,202,041 | 5/1980 | Kaplow et al. | 364/900 |
| 4,241,399 | 12/1980 | Strecker | 364/200 |
| 4,330,822 | 5/1982 | Dodson | 364/200 |
| 4,429,372 | 1/1984 | Berry | 364/900 |
| 4,432,057 | 2/1984 | Daniell | 364/200 |
| 4,434,475 | 2/1984 | McCaskill | 364/900 |
| 4,454,576 | 6/1984 | McInroy | 364/200 |
| 4,703,423 | 10/1987 | Bado | 364/400 |
| 4,710,885 | 12/1987 | Litteken | 364/518 |
| 4,713,775 | 12/1987 | Scott | 364/513 |
| 4,748,439 | 5/1988 | Robinson | 364/900 |
| 4,750,135 | 6/1988 | Boilen | 340/719 |
| 4,819,160 | 4/1989 | Tanaka | 364/200 |
| 4,827,423 | 5/1989 | Beasley | 364/468 |
| 4,833,597 | 5/1989 | Wakayama | 364/200 |
| 4,868,733 | 9/1989 | Fujisawa | 364/200 |
| 4,939,689 | 7/1990 | Davis | 364/900 |
| 4,951,196 | 8/1990 | Jackson | 364/401 |

FOREIGN PATENT DOCUMENTS 0179206  4/1986  European Pat. Off. .

OTHER PUBLICATIONS

Computers and Graphics, vol. 10, No. 2, 1986, "Decentralized Processing of Documents", Ute Flasch and Angela Scheller, pp. 119-131.
Computer, vol. 21, No. 1, Jan. 1986, "Styles in Document Editing Systems", Jeff Johnson and Richard J. Beach, pp. 32-43.

Primary Examiner—Thomas C. Lee
Assistant Examiner—Eric Coleman
Attorney, Agent, or Firm—Andrew J. Dillon

[57] ABSTRACT

A system represents a variable construct within a structured data stream. Structured data streams typically include a plurality of components, each component having multiple parameters therein. A trigger or other flag element within the data stream is utilized to provide a link or reference to a variable construct definition which has been created by the data stream originator or an independent end user. The variable construct definition is then utilized to determine previously nonexistent data which may then be utilized to process at least a portion of the data stream. In this manner, variable data within a structured data stream may be processed by linking the variable data to a non-variable construct within the data stream.

5 Claims, 4 Drawing Sheets

VARIABLE CONSTRUCT RESOURCE OBJECT

BEGIN VARIABLE CONSTRUCT RESOURCE SF <NAME=VAR CONS L>
  VARIABLE CONSTRUCT DESCRIPTOR SF
    <PROCESSING PROCEDURE RESOURCE REFERENCE = PROCS 1>
    <FORMATTING PROCEDURE RESOURCE REFERENCE= FORMATS 1>
    <PRESENTATION STYLE = X'ØØ'(ARABIC)>
    <FONT = FONT 1>
  VARIABLE CONSTRUCT DEFINITION SF
    <NAME IDENTIFIER = 'VAR 1'>
    <PROCESSING INFO=<MIN VALUE = Ø>
                   <MAX VALUE = 999>
                   <WRAP = NO>
                   <RESET = YES>
                   <RESULT VALUE=CALL NUM FNC A(CUR.VALUE('VAR 1'))>>

<FORMATTING INFO=<PRESENTATION STYLE=X'Ø4'(LOWER ROMAN)>
                   <FONT = FONT 2>
                   <PRESENTATION VALUE=CALL STRING PROC 1 (RESULT
                                             VALUE)>>

<EXPRESSION =    <OPERATOR = CONCAT>
                        <PARM 1 = DASH ('-')>
                        <PARM 2 = BLANK (' ')>
                        <PARM 3 = PRESENTATION VALUE>
                        <PARM 4 = BLANK (' ')>
                        <PARM 5 = DASH ('-')>

<DATA STREAM PROC=<DS PROC A>>

VARIABLE CONSTRUCT DEFINITION SF
    <NAME IDENTIFIER = 'VAR 2'>
    <PROCESSING INFO=<MIN VALUE = 1>
                   <MAX VALUE = 9>
                   <WRAP = YES>
                   <RESET= YES>
                   <RESULT VALUE=CALL NUM FNC A(CUR VALUE('VAR 2'))>>

<FORMATTING INFO = <PRESENTATION VALUE=CALL STRING PROC 2 (RESULT
                                                + VALUE)>>
    <EXPRESSION =    <OPERATOR =CONCAT>
                        <PARM 1 = PRESENTATION VALUE>
                        <PARM 2 = PERIOD ('.')>

<DATA STREAM PROC=<DS PROC B>>
              •
              •
              •
END VARIABLE CONSTRUCT RESOURCE SF

*Fig. 2*

VARIABLE CONSTRUCT REPRESENTATION EMBEDDED IN DATA STREAM WHICH REFERENCES DEFINITION FOR DYNAMICALLY GENERATING DATA USED IN PROCESSING THE DATA STREAM

CROSS REFERENCE TO RELATED APPLICATION

This Application is related to U.S. patent application Ser. No. 07/213,424, now abandoned filed of even date herewith and by the inventors hereof and assigned to International Business Machines Corporation, entitled "REPRESENTATION OF VARIABLE CONSTRUCTS WITHIN A STRUCTURED DATA STREAM."

BACKGROUND OF THE INVENTION

1. Technical Field

This invention relates in general to digital communications and in particular to the management and processing of data streams in a manner which permits variable constructs to be represented within a structured data stream.

2. Background Art

Management of a data stream in a digital communications network, such as a local area network (LAN), or larger teleprocessing networks, presents many problems, particularly when it is desired to represent a variable construct within a data stream which is highly structured. By variable construct, what is meant is a general variable data expression within a data stream which is derived as a result of processing a general variable data description or definition which is composed of a sequence of data stream controls, the content of which vary depending upon the general variable description, the triggers which cause processing of the control sequence to occur and the linkage of the general variable to other constructs within the data stream.

Certain known systems exist which permit the inclusion of selected variable data within a data stream as long as the variable data is constrained to a preselected structured field. However, these systems do not permit the utilization of truly variable data nor do they permit an efficient utilization of data stream resources.

Recently, a data stream management system has been proposed which utilizes an off-line shell structure which includes formatting and processing information which may be utilized to manage and process tagged constructs or elements that are independent of the data content, but may appear concurrently with the data in a data stream representation of a document created by an editor or other similar application. The shell structure may be located off-line, or separate from the data stream and transmitted independently from the data stream, or it may be located within the data stream and transmitted therewith.

The above-referenced system includes a tag element function which links constructs in a data stream by referencing named constructs in the shell structure. The constructs in a shell structure specify the rules, relationships, and formatting information that govern the processing and management of a portion of the data stream. While this system represents an advance in the efficiency and flexibility of data stream management, it is designed to control the processing of data stream content and cannot be utilized to create, evaluate, or calculate the status of previously nonexistent data which may then be utilized to process a portion of the data stream.

Therefore, it should be obvious that a need exists for an improvement in data stream management techniques which permit the utilization of variable data within structured data streams.

SUMMARY OF THE INVENTION

It is therefore one object of the present invention to provide an improved data stream management technique.

It is another object of the present invention to provide an improved data stream management technique which enhances data stream flexibility with regard to the utilization of variable data.

It is yet another object of the present invention to provide an improved data stream management technique which enhances data stream flexibility with regard to the utilization of variable data in a highly structured data stream.

The foregoing objects are achieved as is now described. Structured data streams typically include a plurality of components, each component having multiple parameters or structured fields. A trigger element such as a flag, within the data stream is utilized to provide a link or reference to a variable construct definition which has been created by the data stream originator or an independent end user. The variable construct definition is then utilized to determine the status of previously nonexistent data which may then be utilized to process a field within the data stream. In this manner, variable data may be processed by linking the variable data to a non-variable construct within the data stream.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 2 is a high level textual description of a variable construct resource object in accordance with the method of the present invention;

DETAILED DESCRIPTION OF THE PREFERRED EMBODIMENT

Figure 1:
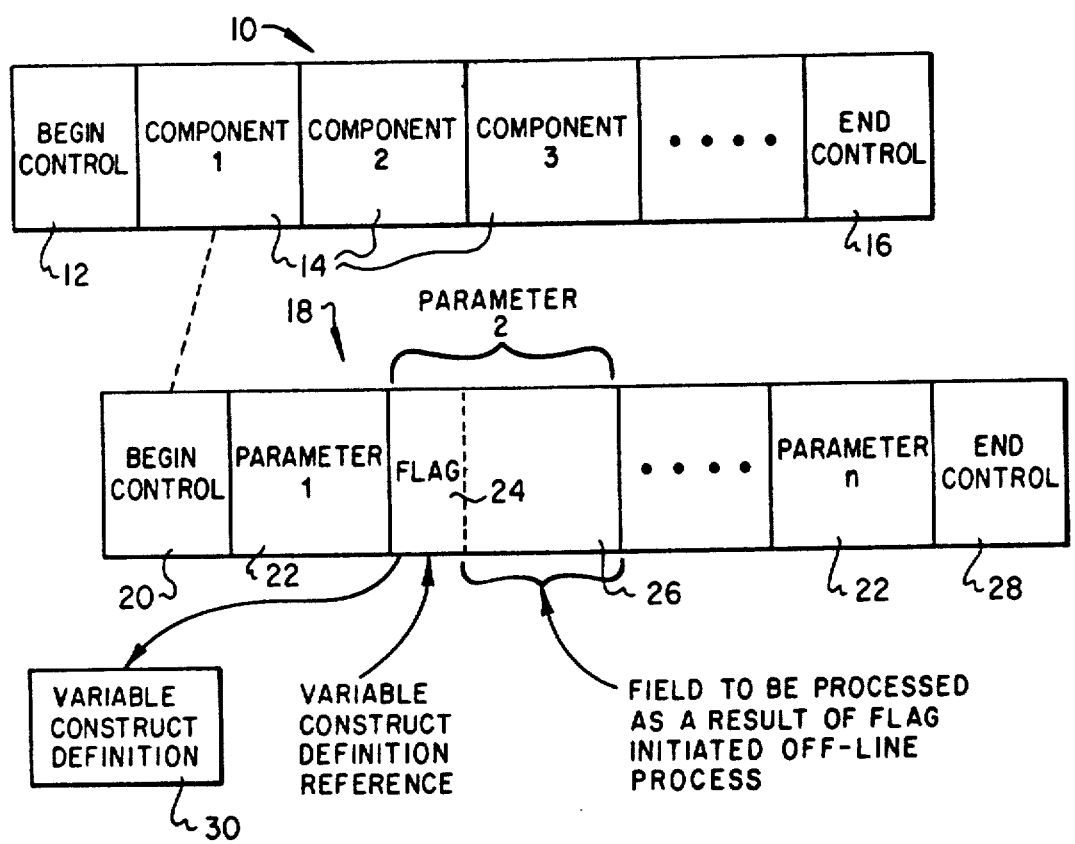
FIG. 1 is a pictorial representation of a generic structured data stream including a variable construct in accordance with the present invention.

With reference now to the figures, and in particular with reference to FIG. 1, there is depicted a pictorial representation of a generic structured data stream 10. As can be seen, data stream 10 starts with a begin control 12 and includes a plurality of components 14, each of which comprises one or more structured fields. Finally, an end control 16 signifies the ending of data stream 10.

Each component 14 of data stream 10 preferably includes a plurality of individual segments, one of which is illustrated at reference numeral 18. As can be seen, selected component 18 also starts with a begin code 20 which signifies the initiation of selected component 18. A plurality of parameters 22 are included, each of which is comprised of one or more structured fields and an end control 28 is utilized to signify the termination of component 18.

As is illustrated, in accordance with the method of the present invention, a selected parameter within component 18 may include a flag 24 which provides a reference to variable construct definition 30. Variable construct definition 30 may be located within data stream 10 or, as depicted, may be "off-line" or not located within data stream 10. As one example, in the depicted embodiment of the present invention, variable construct definition 30 may be transmitted from an originating station to a receiving station independently of data stream 10 and may be stored in a local memory device in any form recognizable to the network. Variable construct definition 30 is then utilized, in accordance with the method of the present invention, to process field 26.

Variable construct definition 30 is preferably utilized to evaluate or calculate the status of previously nonexistent variable data. As one simple example, a data stream 10 may represent a document, such as a "book". The document may be further sectioned into a "forward," a "body," an "index" and one or more "appendices". Within the document, page number formats within individual sections may vary. That is, page numbers within the forward may be expressed as lower case Roman numerals. Page numbers within the body may be expressed as consecutive Arabic numerals and page numbers within an appendix may be expressed as an alphanumeric combination.

In the event an end user wishes to alter a data stream by including an additional page, a flag within the data stream may be utilized, in accordance with the present method, to refer to a variable construct definition 30 which may then be utilized to generate a page number by evaluating the status of a page counter and determining what section of the document is involved. In this manner, a variable construct, the page number, may be simply represented in a structured data stream by linking a variable construct definition to a flagged non-variable construct within the data stream.

Referring now to FIG. 2, there is depicted a high level textual description of a variable construct resource in accordance with the method of the present invention. As can be seen, the variable construct resource includes various descriptive factors including references to a processing procedure resource, a formatting procedures resource, a presentation style and font descriptor. Additionally, the variable construct resource includes two variable construct definitions, VAR 1 and VAR 2, each one of which includes processing information including an allowable range of values; formatting information including presentation style and font information; an expression definition which defines the manner in which the previously nonexistent data will be presented; and, a reference to a data stream procedure.

Figure 3:
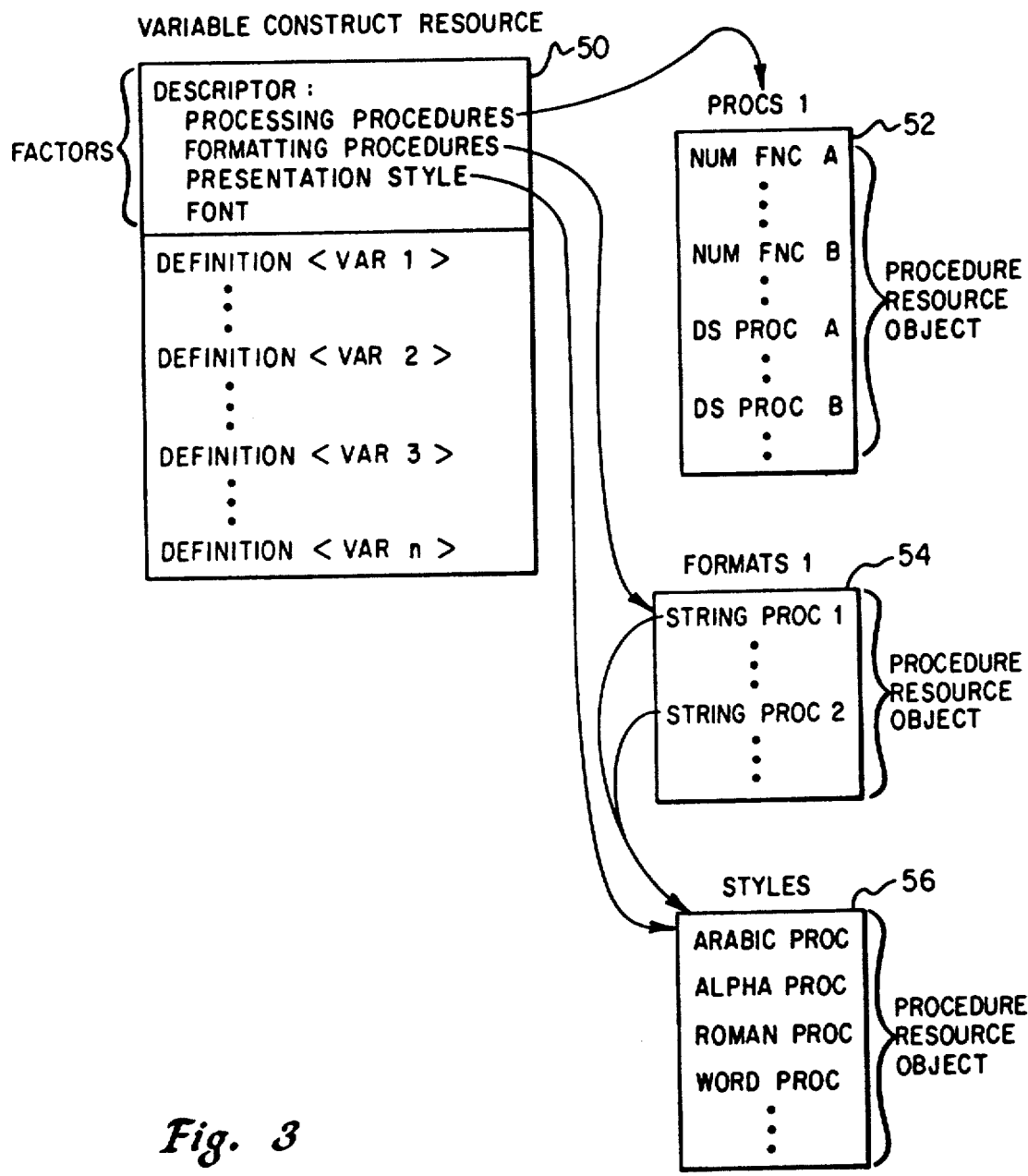
FIG. 3 is a graphic representation of a variable construct resource in accordance with the present invention.

With reference now to FIG. 3, a graphic representation of a variable construct resource is depicted. As may be seen, variable construct resource 50 includes a descriptor section, as described above, and a plurality of variable construct definitions, VAR 1 through VAR n. References within variable construct resource 50 are utilized to access a plurality of procedure resource objects 52, 54, and 56. Each procedure resource object includes a plurality of procedures which are utilized, in accordance with the method of the present invention, to dynamically generate previously nonexistent data which may then be utilized to process at least a portion of the data stream.

Figure 4:
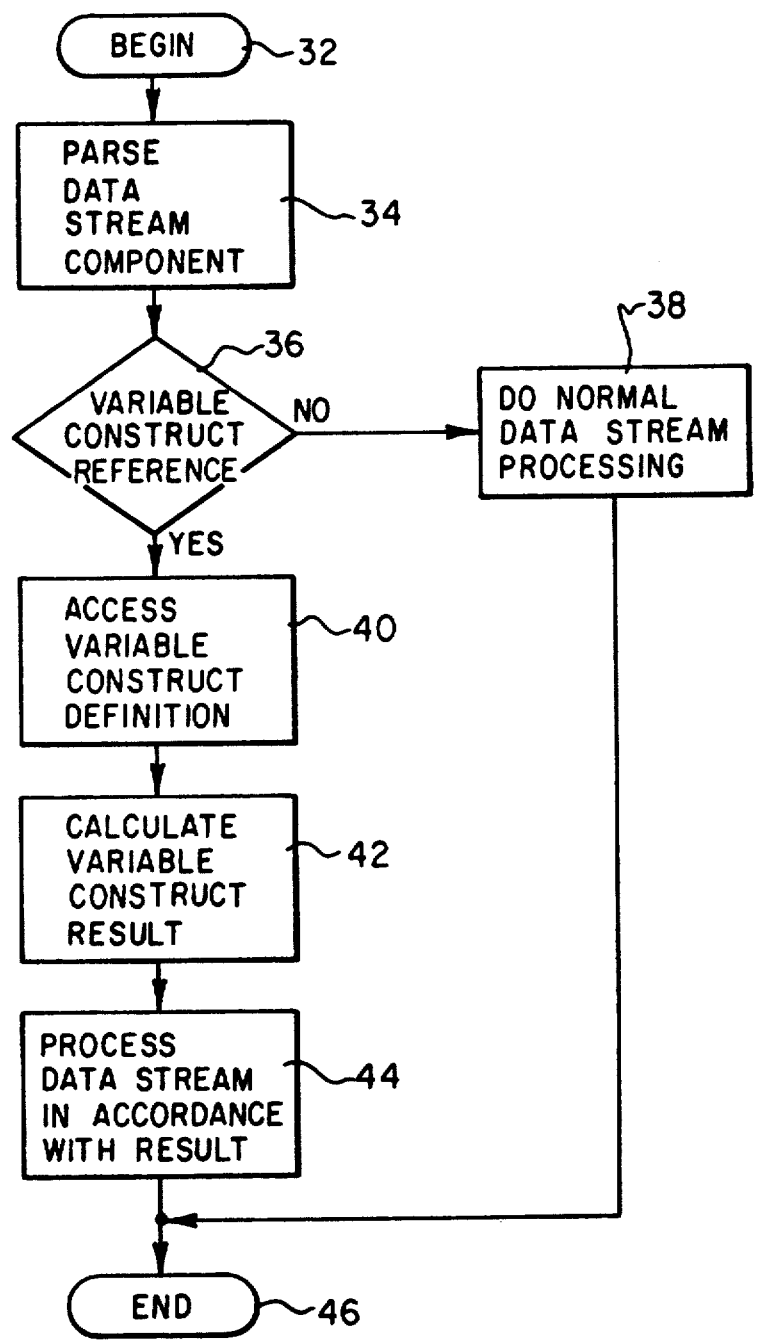
FIG. 4 is a logic flow diagram of the method of the present invention.

Referring now to FIG. 4, there is depicted a logic flow diagram of the method of the present invention. As can be seen, after beginning at step 32, block 34 depicts the parsing of data stream 10 (see FIG. 1). Block 36 is then utilized to determine whether or not a reference or trigger element, such as a flag is included within the data stream which refers to a variable construct definition. If not, block 38 signifies the normal processing of the data stream until the end of the data stream has been reached, as illustrated in block 46.

In the event a reference to a variable construct definition is detected at block 36, block 40 depicts the accessing of a variable construct definition. Block 42 then illustrates the calculation of a result of the variable construct definition, or an evaluation of existing data to determine previously nonexistent data. Next, block 44 depicts the processing of the data stream in accordance with the results obtained from an evaluation of the variable construct definition. In this manner, variable data is effectively managed within a structured data stream by permitting a tagged non-variable construct to provide a link to a variable construct definition.

While the invention has been particularly shown and described with reference to a preferred embodiment, it will be understood by those skilled in the art that various changes in form and detail may be made therein without departing from the spirit and scope of the invention.

We claim:

1. A method in a data processing system for transmitting, managing and processing fields within a highly structured data stream independently of an application program which generated said highly structured data stream, said method comprising the steps of:
   generating a highly structured data stream for transmission from an originating station to a receiving station;
   creating at least one variable construct definition having a process therein for dynamically generating selected data in response to a reference thereto, said selected data being nonexistent prior to said reference to said variable construct definition;
   inserting a reference to said at least one variable construct definition within said highly structured data stream; and
   processing at least a portion of said highly structured data stream at said receiving station in accordance with said dynamically generated selected data.

2. The method according to claim 1 wherein said step of creating at least one variable construct definition is performed by an end user at said receiving station.

3. The method according to claim 1 wherein the step of creating at least one variable construct definition is performed at said originating station by an originator of said data stream.

4. The method according to claim 3 wherein said at least one variable construct definition is transmitted from said originating station with the said data stream.

5. A data processing system for transmitting, managing and processing fields within a highly structured data stream independently of an application program which generated said highly structured data stream, said data processing system comprising:

means for generating a highly structured data stream for transmission from an originating station to a receiving station;

means for creating at least one variable construct definition having a process therein for dynamically generating selected data in response to a reference thereto, said selected data being nonexistent prior to said reference to said variable construct definition;

means for inserting a reference to said at least one variable construct definition within said highly structured data stream; and means for processing at least a portion of said highly structured data stream at said receiving station in accordance with said dynamically generated selected data.

* * * * *